United States Patent
Nishimura

(10) Patent No.: US 6,442,468 B2
(45) Date of Patent: Aug. 27, 2002

(54) VEHICLE TRANSMISSION WITH MEMORIZED STARTING GEAR SELECTION

(75) Inventor: Nobuyuki Nishimura, Kawasaki (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/802,034

(22) Filed: Mar. 8, 2001

(30) Foreign Application Priority Data

Mar. 14, 2000 (JP) ........................................ 2000-076368

(51) Int. Cl.$^7$ ............................................. F16H 61/02
(52) U.S. Cl. ............................................ 701/59; 477/97
(58) Field of Search ........................ 701/58, 59; 477/97

(56) References Cited

U.S. PATENT DOCUMENTS

| | | | |
|---|---|---|---|
| 4,430,637 A | * 2/1984 | Koch-Ducker et al. | 340/431 |
| 5,364,317 A | * 11/1994 | Amemiya | 475/132 |
| 5,406,862 A | * 4/1995 | Amsallen | 477/900 |
| 5,984,828 A | 11/1999 | Huber | 477/78 |
| 6,128,974 A | * 10/2000 | Hughes | 192/3.63 |

FOREIGN PATENT DOCUMENTS

| | | |
|---|---|---|
| DE | 29 52 204 A1 | 6/1981 |
| DE | 198 39 837 A1 | 3/2000 |
| EP | 0 681 121 A2 | 11/1995 |
| JP | 7-63252 | 3/1995 |

* cited by examiner

*Primary Examiner*—Michael J. Zanelli
(74) *Attorney, Agent, or Firm*—McCormick, Paulding & Huber LLP

(57) ABSTRACT

A vehicle transmission (302) is equipped with an actuator (303) for shifting the transmission (302). A controller (306) causes the actuator (303) to shift the transmission (302) based on movement of a shift lever (308). A learning unit (306) memorizes a gear position of when a vehicle is stopped, a brake pedal is stamped, an accelerator pedal (307) is not stamped, and a certain transmission gear is selected, as a start gear. The vehicle moves from that start gear and stops. When the vehicle is restarted, the learning unit (306) selects the memorized start gear and the controller causes the actuator (303) to shift the transmission to that start gear. The learning unit (306) separately memorizes the gear position of when the vehicle tows another vehicle and the gear position of when the vehicle does not tow any vehicle.

30 Claims, 5 Drawing Sheets

FIG. 5
| SPLITTER | MAIN GEAR | RANGE GEAR | SYNTHETIC GEAR |
|----------|-----------|------------|----------------|
| L | 1st | L | 1st |
| H | 1st | L | 2nd |
| L | 1st | H | 9th |
| H | 1st | H | 10th |
FIG. 6
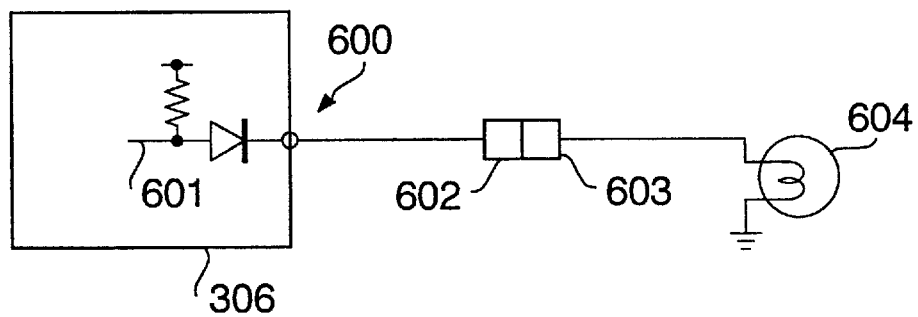
FIG. 7
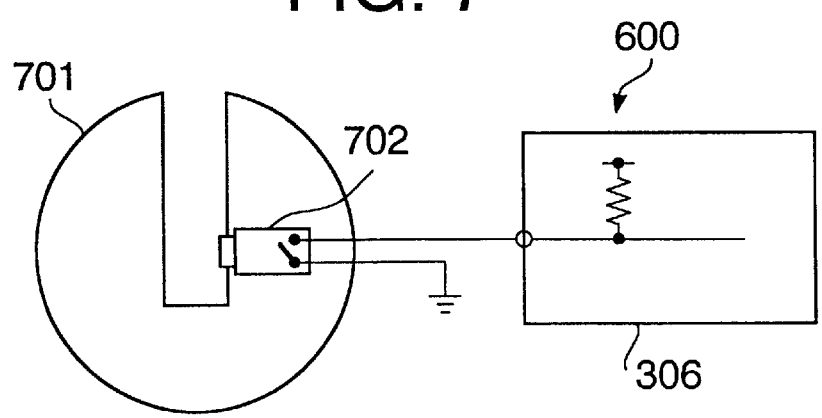

VEHICLE TRANSMISSION WITH MEMORIZED STARTING GEAR SELECTION

CROSS REFERENCES TO RELATED APPLICATION

This application claims priority under 35 USC 119 of Japanese Patent Application No. 2000-76368 filed on Mar. 14, 2000, the entire disclosure of which is incorporated herein by reference.

BACKGROUND OF THE INVENTION

1. Field of the Invention

The present invention generally relates to a vehicle transmission that is shifted by an actuator in response to a shift lever movement, and more particularly to a transmission that realizes smooth and comfortable starting of a vehicle.

2. Description of the Related Art

A total weight and load of large trucks such as tractor-trailer greatly differs from when the tractor does not tow a trailer (or the trailer is empty and carries no load) to when the tractor tows a fully-loaded trailer. In order to maintain a satisfactory engine running condition and allow a driver to drive a vehicle comfortably in any situations, a large truck has a considerably greater number of gear positions than a small truck (e.g., pick-up truck). For example, the large truck is equipped with a four-gear main gear assembly, a two-gear splitter gear assembly of relatively small gear ratio in front of the main gear assembly, and a two-gear range gear assembly of relatively large gear ratio behind the main gear assembly. The combination of the splitter gear assembly, main gear assembly and range gear assembly provides sixteen gear positions as a whole. By employing such large-number-gear transmission, a driver can select a suitable gear so that an appropriate engine condition is obtained across a wide range of vehicle speed. Further, the driver can accelerate and decelerate the vehicle smoothly.

Gear position change is effected by an actuator under the control of an associated controller (computer). However, initiation of the gear position change is effected by either automatically under the control of the computer or manually. The driver can momentarily tilt a shift lever to the front and back from a D position or range (=H position), which is a stable driving gear position. In the manual shift mode, if the driver moves the shift lever forward from the H position, the computer recognizes that the driver wants to shift up the transmission, and if the driver moves the shift lever backward, the computer assumes that the driver intends to shift down the transmission. Subsequently, the computer shifts up or down the transmission from a current gear position. By repeating this shift up (or down) operation, the transmission gear position is gradually raised (or lowered). In the automatic shift mode, the driver does not move the shift lever; instead, the shift lever remains in the D position. The computer selects a most appropriate gear position based on an engine running condition and/or vehicle speed.

Although the transmission has sixteen gears, all the gears from the first to sixteenth are not used during driving. Some of the gears may be frequently utilized depending upon vehicle load condition, driver's intention, etc. For instance, when a large truck with a trailer starts moving, a very low gear position such as first or second gear is generally selected if the trailer carries a relatively heavy load. However, if the load is not so heavy, a relatively high gear position such as fourth, fifth or sixth gear may be selected. In the latter case, the tractor-trailer can smoothly start and accelerate with the relatively high gear, and the driver can experience comfortable starting. Further, since clutch disengagement and engagement take place less frequently as compared with the former case, clutch wear is reduced and its life is elongated. If the tractor does not tow the trailer, a still higher gear such as ninth gear may be selected to experience comfortable starting. The lowest gear (first or second gear) may be selected in a particular situation (when circumstances demand), e.g., when the vehicle starts on an uphill, when an engine torque should be raised because of low atmospheric pressure in mountains, and when the driver should operate the vehicle delicately at a low speed (to park in a garage).

In order to start the large truck having sixteen gear positions smoothly, a gear for starting should be selected appropriately based on a vehicle load, road condition, driver's intention, atmospheric condition, etc. However, the shift lever only allows shifting up and down so that the first gear is always selected in every initial setting and the shift lever operation must be repeated until a desired start gear is reached. Thus, the driver is required to tilt the shift lever repeatedly every time the driver wants to start the vehicle from a stop condition. This is troublesome and a certain period is needed until the vehicle starts, thereby degrading driving comfort.

To solve the above described problem, Japanese Patent Application, Laid Open Publication No. 7-63252 entitled "Automatic Transmission of Vehicle" discloses an arrangement that determines starting of a vehicle from vehicle speed and memorizes a transmission gear at that vehicle speed as a start gear for a next starting of the vehicle. When the vehicle is started next time, the memorized gear position is immediately selected whereby the driver does not have to shift up the transmission to reach a desired start gear. According to this technique, rising up of the vehicle speed from zero is a trigger condition to memorize the gear position so that the current start gear position is always memorized for the next start up every time the vehicle is started. However, driving circumstances are not always the same. For example, an unusual gear should be selected if the vehicle starts on an uphill. Such gear position is memorized for the next start according the conventional technique. If the vehicle starts on a flat road next time, the previous start gear position is not appropriate for the start of this time. This makes the driver uncomfortable.

Further, a suitable start gear position for the tractor is significantly different from when the tractor tows the trailer to when the tractor does not the trailer. When the tractor starts without the trailer and stops and then the tractor is restarted with the trailer, the start gear position suited for the no trailer condition is applied to the tractor with the trailer. This makes the start awkward.

SUMMARY OF THE INVENTION

One of the objects of the present invention is to provide a multi-gear transmission that can solve the above problems.

According to one aspect of the present invention, there is provided a vehicle transmission arrangement including an actuator for shifting a transmission, a controller for causing the actuator to shift the transmission based on movement of a shift lever, and a learning unit for memorizing a gear position of when a vehicle is stopped, a brake pedal is stamped, an accelerator pedal is not stamped, and a certain transmission gear is selected, as a start gear, and for selecting the memorized start gear for subsequent starting of the vehicle.

The learning unit may memorize the gear position if the vehicle is stopped over a predetermined period (e.g., about 1.5 seconds). The learning unit may separately memorize the gear position of when the vehicle tows another vehicle (e.g., sixth gear) and the gear position of when the vehicle does not tow another vehicle (e.g., ninth gear). The controller may not cause the actuator to shift the transmission if the gear position instructed by the shift lever movement for starting is higher than a predetermined gear position. Alternatively the controller may cause the actuator to shift the transmission to a predetermined gear if the gear position instructed by the shift lever movement for starting is higher than the predetermined gear position. The arrangement may further include a detector for determining whether the vehicle tows another vehicle or not.

BRIEF DESCRIPTION OF THE DRAWINGS

FIG. 5 illustrates a table of gear combination of the transmission;

FIG. 6 schematically illustrates a trailer detector; and

FIG. 7 illustrates a modified trailer detector.

DETAILED DESCRIPTION OF THE INVENTION

Now, embodiments of the present invention will be described in reference to the accompanying drawings.

Figure 1:
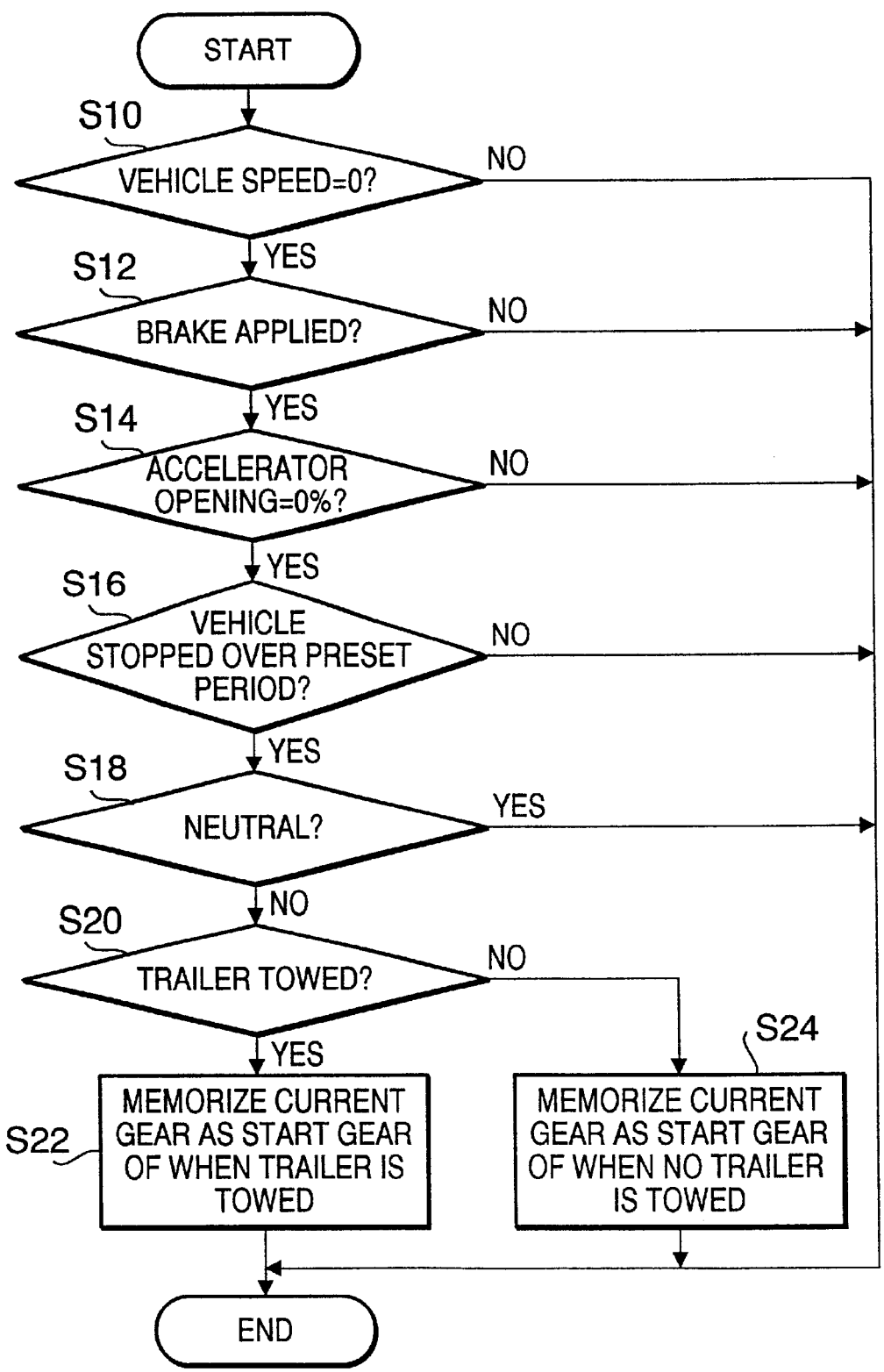
FIG. 1 illustrates a flowchart of start gear learning process according to the present invention.
Figure 2:
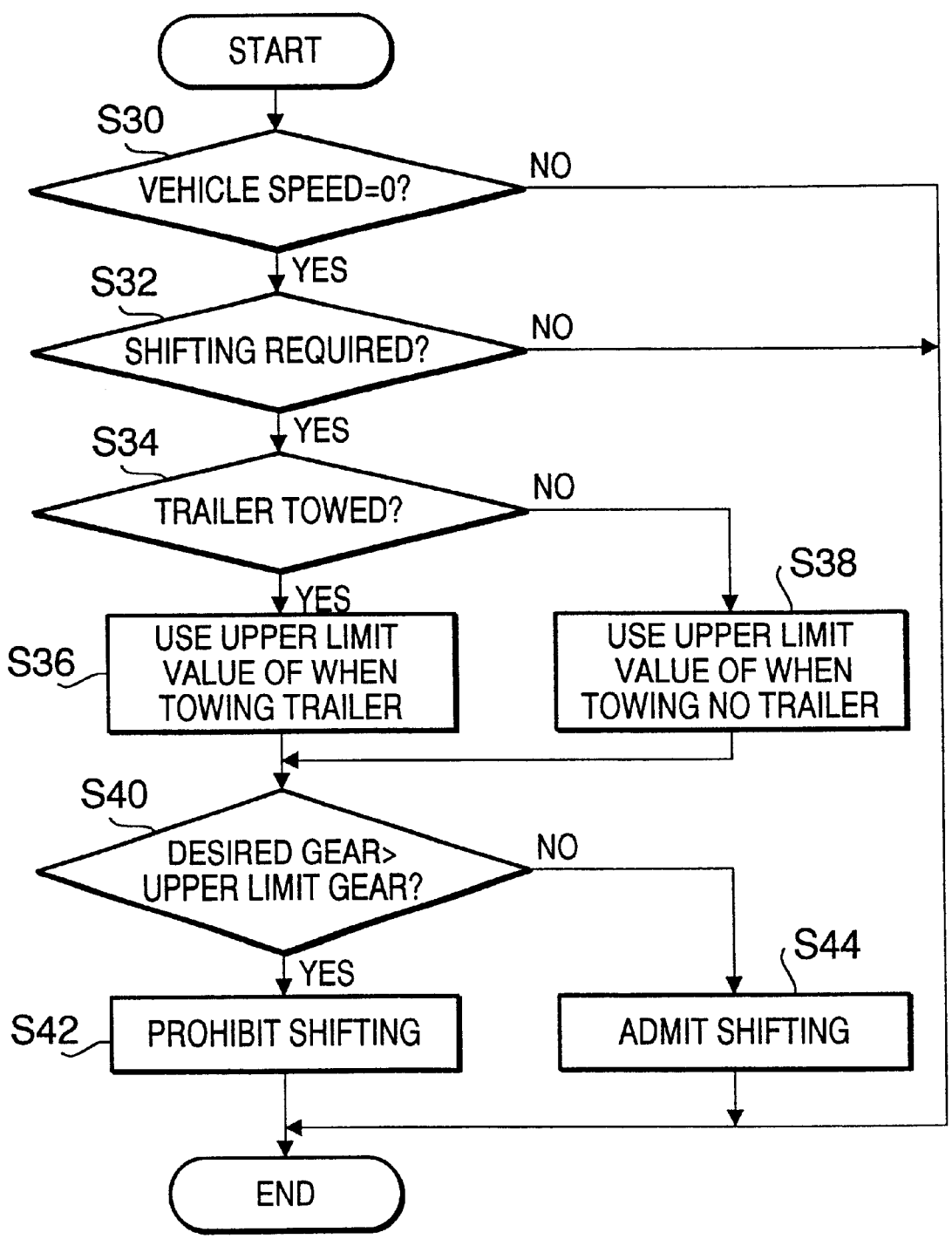
FIG. 2 illustrates a flowchart of start gear upper limit determination process according to the present invention.

A transmission of the present invention is equipped with a computer that causes an actuator to shift the transmission in response to shift up and down operations of a shift lever. The transmission further possesses a learning function as illustrated in FIG. 1 and a start gear limiting function as illustrated in FIG. 2. The present invention is preferably applied to a tractor-trailer with a diesel engine and multi-gear transmission. Such tractor-trailer will be described below. The tractor further possesses an automatic clutch mechanism for disengaging and engaging a clutch with a clutch actuator under the control of computer, and a manual clutch disengagement and engagement mechanism that is effected upon stamping and releasing of a clutch pedal.

Figure 3:
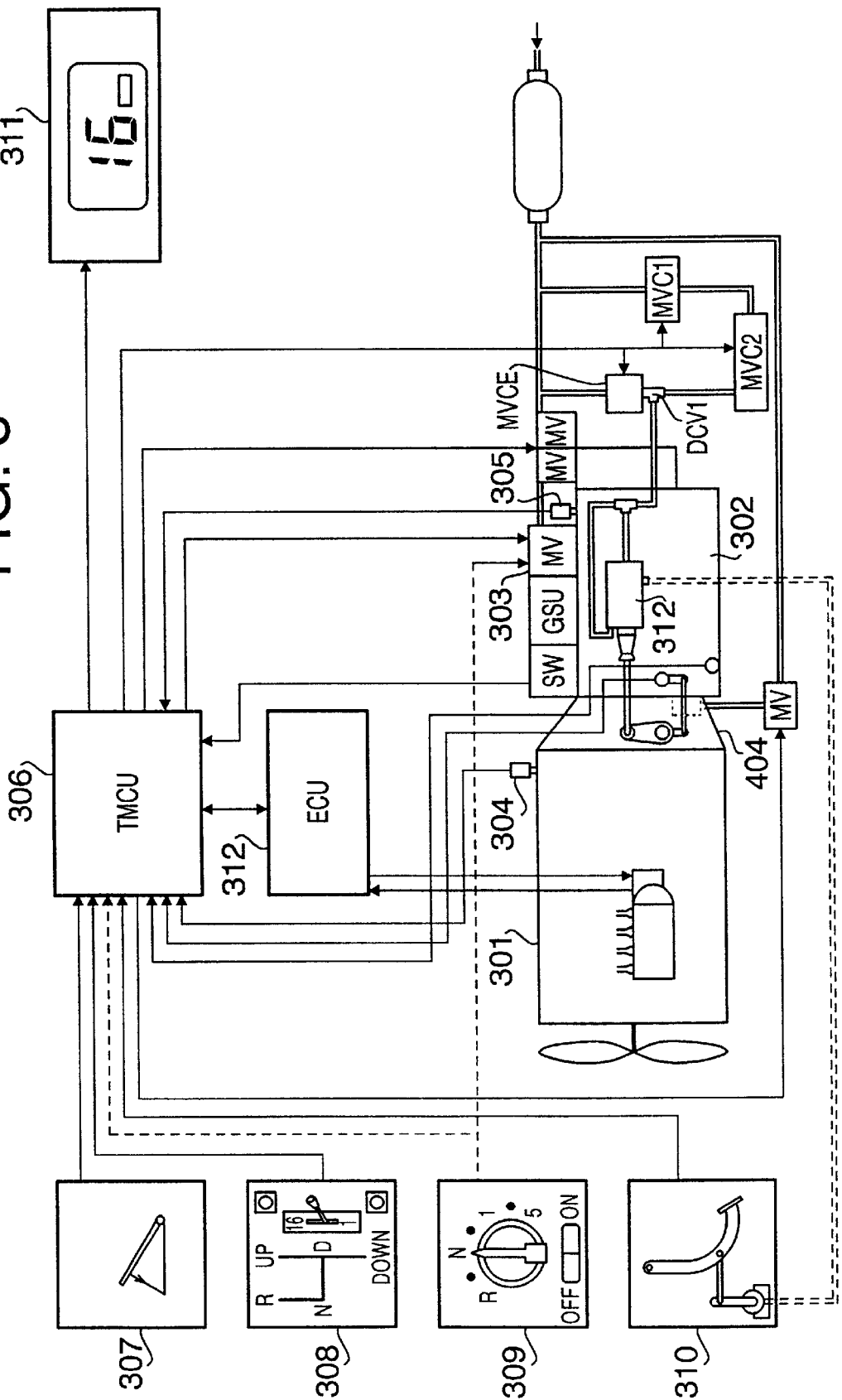
FIG. 3 illustrates an engine drive mechanism incorporating a transmission arrangement of the present invention.

Referring to FIG. 3, an engine drive system includes the transmission 302 connected to an engine 301 via a clutch 404, a pneumatic cylinder unit 303 which serves as an actuator of the transmission 302, an engine revolution speed sensor 304 for detecting engine rotations, an output shaft rotation speed sensor 305 for detecting rotation speed of an output shaft of the transmission 302 and converting it to vehicle speed, a computer (transmission control unit: TMCU) 306 for executing a control logic related to transmission gear position change, an accelerator sensor 307 for detecting depression of an accelerator pedal and converting it to an accelerator opening degree, a shift lever unit 308 for transmitting a shifting operation made by a driver to the computer, an automatic/manual (A/M) selection switch for shift mode switching between a manual mode and an automatic mode, an emergency gear position switch 309 for selecting a certain gear in a special occasion such as in an emergency situation, a clutch pedal 310 for disengaging and engaging the clutch manually, a brake sensor (not shown) for detecting shallow depression of a brake pedal, a trailer socket (602 in FIG. 6) located at a rear of the tractor for transmitting a trailer brake lamp illumination signal to the trailer, a trailer detector (600 in FIGS. 6 and 7) for determining whether the trailer is towed by the tractor, and a gear position indicator 311 located in a console or meter panel unit in front of a driver for indicating a current gear position. Another computer (engine control unit: ECU) 312 executes a control logic related to the engine operation such as ignition. The shift lever unit 308 has rear (R), neutral (N), drive (D) or hold (H), shift up (UP) and shift down (DOWN) positions. The drive and hold positions are stable or stationary positions, and the shift up and down positions are momentary or instantaneous positions. The shift lever 308 also has the A/M switch at the top of a lever stem. Reference numeral 312 designates a clutch actuator, MVC1 an electromagnetic valve for maintaining air pressure, MVC2 a clutch proportion valve, and MVCE another electromagnetic valve for emergency. More detail of the engine drive system shown in FIG. 3 can be found in Japanese Patent Application No. 2000-63337 or corresponding U.S. patent application Ser. No. 09/794,780 entitled "ENGINE OVERRUN PREVENTION SYSTEM FOR AUTOMATIC TRANSMISSION", filed Feb. 27, 2001, the entire disclosure of which is incorporated herein by reference.

Figure 4:
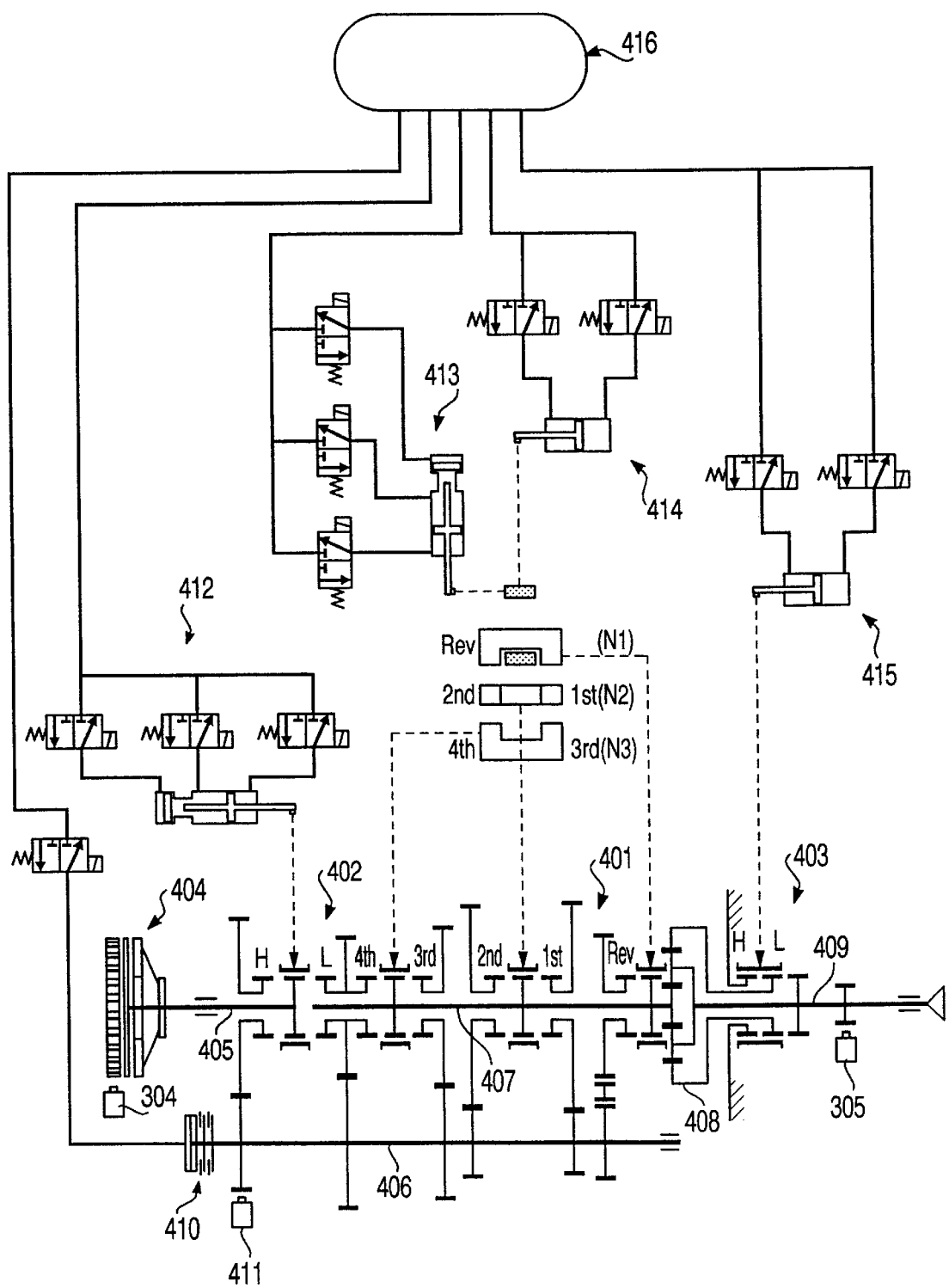
FIG. 4 illustrates the transmission and associated pneumatic cylinders according to the present invention.

Referring to FIG. 4, the detail of the transmission 302 and pneumatic cylinders will be described.

The transmission 302 includes a four-gear main gear assembly 401, a splitter assembly 402 with relatively small gear ratio in front of the main gear assembly 401, and a range gear assembly 403 with relatively large gear ratio behind the main gear assembly 401. The splitter assembly 402 has three positions, namely, a high gear (H), low gear (L) and neutral. Rotations of an input shaft 405 transferred from a driven plate in the clutch 404 are further transferred to a countershaft 406 at the gear ratio H or L through the splitter assembly 402 or interrupted by the splitter assembly 402. The main gear assembly 401 has six positions, namely first ($1^{st}$), second ($2^{nd}$), third ($3^{rd}$), fourth ($4^{th}$), reverse (Rev) and neutral positions. Thus, the rotations of the countershaft 406 are transferred to a main shaft 407 at four gear ratios in the same rotational direction or one gear ratio in the opposite rotational direction through the main gear assembly 401 or interrupted by the main gear assembly. The range gear assembly 403 includes a planetary gear mechanism 408. Specifically, it includes a sun gear secured on the main shaft 407, a plurality of planetary gears around the sun gear, a carrier secured to the output shaft 409 for supporting the planetary gears, and a ring gear around the planetary gears. An element to be coupled with the ring gear is changed to transfer the rotations of the main shaft 407 to the output shaft 409 at the gear ratio of H or L.

A countershaft brake 410 is provided for braking the countershaft 406. A sensor 411 detects the countershaft rotation speed. The countershaft brake 410 and countershaft rotation speed sensor 411 are used to synchronize the rotation of a dog gear on the main shaft 407 with that of a sleeve. In other words, since an electronic synchronization control is conducted without mechanical synchronization units in the illustrated embodiment, the countershaft brake 410 is turned on to lower the dog gear rotation speed when the sleeve rotation speed calculated from an output of the output shaft rotation sensor 305 is smaller than the dog gear rotation speed calculated from an output of the countershaft rotation sensor 411. Eventually, the rotation speed of the output shaft matches that of the countershaft, and the sleeve is engaged.

The pneumatic cylinder unit includes a splitter cylinder 412 stroke-controlled by three electromagnetic valves, a select cylinder 413 stroke-controlled by three electromagnetic valves, a sleeve shift cylinder 414 stroke-controlled by two electromagnetic valves, a range cylinder 415 stroke-controlled by two electromagnetic valves, and the countershaft brake 410 on/off-controlled by a single electromagnetic valve. These electromagnetic valves are cooperatively or selectively operated to switch and selectively actuate various parts of the transmission. Pneumatic pressure is supplied from an air tank 416. More detail of the transmission and pneumatic cylinders shown in FIG. 4 can also be found in the above-mentioned Japanese Patent Application No. 2000-63337 or corresponding U.S. patent application Ser. No. 09/794,780 entitled "ENGINE OVERRUN PREVENTION SYSTEM FOR AUTOMATIC TRANSMISSION".

Referring to FIG. 5, depicted is a table of various gear combinations of the transmission 302 having sixteen gear positions, i.e., how the splitter assembly 402, main gear assembly 401 and range gear assembly 403 are combined to provide a synthetic gear (gear position of the transmission 302 as a whole). If the main gear assembly 401 is set to its first gear, the range gear assembly 403 is set to its L position, and the splitter assembly 402 is set to its L or H position, the first or second gear among the sixteen gears of the transmission is obtained. If the main gear assembly 401 is set to its first gear, the range gear assembly 403 is set to its H position, and the splitter gear 402 is set to its L or H position, then the ninth or tenth gear among the sixteen gears is obtained. Other combinations are not illustrated, but it is apparent that if other gear positions of the main gear assembly 401 are utilized, the third to eighth and eleventh to sixteenth gears are obtained.

Referring to FIG. 6, illustrated is a trailer detector 600. When the tractor tows the trailer, it is necessary to turn on a brake lamp at the rear of the trailer upon stamping a brake pedal. Thus, a trailer brake lamp illumination signal 601 should be sent to the trailer from the tractor. For this reason, a trailer socket 602 is provided at the rear of the tractor. As a plug 603 extending from the trailer is coupled with the trailer socket 602, the trailer brake lamp signal 601 can reach a trailer brake lamp 604. The trailer detector 600 located in the computer 306 that outputs the trailer brake signal 601 determines whether trailer is towed or not based on voltage drop or current of the brake lamp signal 601. It should be noted that the trailer detector may be located in another computer adapted to control other lamps.

The trailer detector 600 may be modified as illustrated in FIG. 7. Specifically, since a trailer front portion (not shown) is mechanically engaged with the tractor rear portion 701, a contact type or optical type switch 702 is provided on the tractor rear portion 701 to detect the trailer front portion, and on/off of this switch 702 is sent to the trailer detector 600 in the computer 306 to determine if connection is established between the trailer and tractor.

Now, the learning function will be described in detail in reference to FIG. 1.

First, it is determined at S10 whether the vehicle speed is zero km/n or not from the output of the output shaft rotation sensor 305. This confirms that the vehicle stands still. If the vehicle is not stopped, a current situation is not related to selection of a start gear so that no learning is effected. If the vehicle is stopped, there is a possibility that a driver wants to start the vehicle. Thus, the program proceeds to the next step (S12).

At S12, it is determined whether the brake pedal is stamped based on a signal from the brake sensor. If the answer is no, the learning is not effected. It should be noted, however, that this step does not determine in effect whether the brake is working, but whether the driver wants the start gear learning process to start. In other words, the brake sensor signal is a request for the learning. If the brake sensor is not used for this purpose, a separate learning start switch may be provided. In such case, the learning is conducted only when the driver turns on the switch. Use of the brake sensor is advantageous since the number of parts is reduced.

Next, it is determined at S14 whether the accelerator opening is 0%. This checks if the accelerator pedal is not depressed. If the vehicle speed is 0 km/h and the brake sensor is turned on but the accelerator pedal is stamped, it is assumed that the vehicle is on a non-flat road such as uphill. In such case, the learning is not effected. On the other hand, if the accelerator pedal is not stamped, the program proceeds to S16.

At S16 it is determined whether a predetermined period has elapsed since the vehicle stopped. The predetermined period may be 1.5 seconds. This is because there is no need to relearn the start gear if the vehicle is forced to stop just temporarily, e.g., at a stop line or railway crossing. If the predetermined period has elapsed, there is a possibility that the start gear learning is needed. Then, the program proceeds to S18. It should be noted, however, that if the vehicle is forced to stop at a red traffic light, or on its way turning to the left or right, or in front of a crosswalk over the predetermined period, the driver may release the brake pedal or move the shift lever to the neutral position. This terminates the learning process and prevents execution of unnecessary learning. If the vehicle is parked, the driver may soon release the brake pedal or move the shift lever to the neutral position. This also prevents execution of unnecessary learning. On the other hand, if the driver wants to perform the learning process to find out a different start gear after stoppage of the predetermined period, he or she slightly stamps the brake pedal to request the learning.

At the next step of S18, it is determined whether the synthetic gear position of the transmission 302 is not the neutral. If neutral, the vehicle is not in a start stand-by condition so that the learning is not conducted. If not neutral, a certain gear has been selected, and that gear is memorized as the start gear. It should be noted that instead of determining neutral or not, S18 may determine whether the actuator is in the process of shifting. If the actuator completes the shifting operation, a certain gear has been selected for the starting.

If all the conditions above are met, the start gear is learnt. In short, when the vehicles is stopped, the brake pedal is stamped, the accelerator pedal is not depressed, the predetermined period has elapsed after stoppage of the vehicle and the synthetic gear of the transmission is not the neutral, then the start gear learning is effected. Because of this, the start gear learning is conducted only when the driver wants so. The start gear in an unusual situation is not learnt, and further the start gear learning is not permitted even if in a normal situation as far as the driver does not want so. Accordingly, a start gear is memorized according to the driver's intention or desire, and the driver can restart the vehicle comfortably. If the vehicle is in a traffic jam on an uphill, the brake pedal is stamped prior to stamping the accelerator pedal to start the vehicle so that the learning is triggered. For the next start, therefore, a start gear suited for the uphill starting is automatically selected.

Furthermore, at S20 it is determined whether the trailer is towed or not. Presence of the trailer behind the tractor is detected to separately memorize a start gear of when the tractor tows the trailer (S22) and that of when the tractor does not tow the trailer (S24). Thus, when the tractor is started with the trailer, the start gear memorized for that situation is retrieved, and when the tractor is started without the trailer, the start gear memorized for such situation is retrieved. In this manner, an appropriate start gear is always selected. Since a fact that the trailer is towed or not is detected by the trailer detector, the driver does not have to see by his own eyes whether the trailer is connected to the tractor. The driver needs not push any switch to inform the computer of a fact that the trailer is towed or not. This lightens the driver's load.

Referring now to FIG. 2, a process of imposing an upper limit on the start gear will be described. Here, the upper limit is an admissible highest start gear which allows the vehicle to start without excessive load on the transmission parts.

First, it is determined at S30 whether the vehicle speed is zero km/h or not by the output shaft rotation sensor 305. If the vehicle is not stopped, there is no need to select a start gear so that the upper limit imposing process is not effected.

If the answer at S30 is yes, it is then determined at S32 whether a transmission gear position change is requested or not by the shift lever movement. If the shift lever is not operated and the hold (H) position is maintained, the upper limit imposing is not performed.

If the answer at S32 is positive, it is determined at S34 whether the vehicle tows a trailer, and the admissible highest start gear is prepared at S36 or S38 in accordance with the answer at S34. The admissible highest start gear is different from when the vehicle tows the trailer to when the vehicle tows no trailer. For example, it is the sixth gear when the trailer is towed, and the ninth gear when no trailer is towed.

Subsequently, a desired gear position decided by the shift lever movement is compared with the upper limit at S40. If the desired gear position is not higher than the upper limit, the transmission gear position change by the actuator is admitted (S44). Otherwise, the shifting is prohibited (S42).

If the shifting is prohibited, the actuator is not operated and the current gear position is maintained. It should be noted that a gear lower or equal to the upper limit gear may be selected by the actuator if the answer at S40 is yes instead of prohibiting the shifting. In any event, even if the driver intentionally or non-intentionally attempts to start the vehicle at an unreasonably high gear or moves the shift lever unnecessarily frequently, a gear position that imposes an excessive burden on the clutch and transmission parts will not be selected for starting.

What is claimed is:

1. An arrangement for controlling a vehicle transmission comprising:
    an actuator for shifting a transmission;
    a controller for causing the actuator to shift the transmission based on movement of a shift lever; and
    a learning unit for memorizing a gear position of when a vehicle is stopped, a brake pedal is stamped, an accelerator pedal is not stamped, and a certain transmission gear is selected, as a start gear, and for selecting the memorized start gear for subsequent starting of the vehicle.

2. The arrangement for controlling a vehicle transmission according to claim 1 further including a detector for detecting whether the vehicle tows another vehicle, and wherein the learning unit separately memorizes the gear position of when the vehicle tows the another vehicle and the gear position of when the vehicle does not tow the another vehicle.

3. The arrangement for controlling a vehicle transmission according to claim 2, wherein the controller does not cause the actuator to shift the transmission if the gear position instructed by the shift lever movement for starting is higher than a predetermined gear position.

4. The arrangement for controlling a vehicle transmission according to claim 2, wherein the controller causes the actuator to shift the transmission to a predetermined gear or a gear lower than the predetermined gear if the gear position instructed by the shift lever movement for starting is higher than the predetermined gear position.

5. The arrangement for controlling a vehicle transmission according to claim 2, wherein the detector determines whether the vehicle tows the another vehicle by detecting electricity flowing to a brake lamp attached to the another vehicle.

6. The arrangement for controlling a vehicle transmission according to claim 2, wherein the detector determines whether the vehicle tows the another vehicle by detecting mechanical connection between the vehicle and another vehicle.

7. The arrangement for controlling a vehicle transmission according to claim 2, wherein the gear position of when the vehicle tows the another vehicle is a sixth gear and that of when the vehicle does not tow the another vehicle is a ninth gear.

8. The arrangement for controlling a vehicle transmission according to claim 1, wherein the controller does not cause the actuator to shift the transmission if the gear position instructed by the shift lever movement for starting is higher than a predetermined gear position.

9. The arrangement for controlling a vehicle transmission according to claim 8, wherein the predetermined gear position is a gear position that allows the vehicle to start with no excessive load being imposed on transmission and clutch parts.

10. The arrangement for controlling a vehicle transmission according to claim 1, wherein the controller causes the actuator to shift the transmission to a predetermined gear or a gear lower than the predetermined gear if the gear position instructed by the shift lever movement for starting is higher than the predetermined gear position.

11. The arrangement for controlling a vehicle transmission according to claim 10, wherein the predetermined gear position is a gear position that allows the vehicle to start with no excessive load being imposed on transmission and clutch parts.

12. An arrangement for controlling a vehicle transmission comprising:
    an actuator for shifting a transmission;
    a controller for causing the actuator to shift the transmission based on movement of a shift lever; and
    a learning unit for memorizing a gear position of when a vehicle is stopped over a predetermined period and a certain transmission gear is selected, as a start gear, and for selecting the memorized start gear for subsequent starting of the vehicle.

13. The arrangement for controlling a vehicle transmission according to claim 12 further including a detector for detecting whether the vehicle tows another vehicle, and wherein the learning unit separately memorizes the gear position of when the vehicle tows the another vehicle and the gear position of when the vehicle does not tow the another vehicle.

14. The arrangement for controlling a vehicle transmission according to claim 13, wherein the controller does not cause the actuator to shift the transmission if the gear position instructed by the shift lever movement for starting is higher than a predetermined gear position.

15. The arrangement for controlling a vehicle transmission according to claim 13, wherein the controller causes the actuator to shift the transmission to a predetermined gear or a gear lower than the predetermined gear if the gear position instructed by the shift lever movement for starting is higher than the predetermined gear position.

16. The arrangement for controlling a vehicle transmission according to claim 12, wherein the controller does not cause the actuator to shift the transmission if the gear position instructed by the shift lever movement for starting is higher than a predetermined gear position.

17. The arrangement for controlling a vehicle transmission according to claim 12, wherein the controller causes the actuator to shift the transmission to a predetermined gear or a gear lower than the predetermined gear if the gear position instructed by the shift lever movement for starting is higher than the predetermined gear position.

18. The arrangement for controlling a vehicle transmission according to claim 12, wherein the predetermined period is 1.5 seconds.

19. An apparatus comprising:
   means for shifting a transmission;
   means for causing the shifting means to shift the transmission based on movement of a shift lever; and
   means for memorizing a gear position of when a vehicle is stopped, a brake pedal is stamped, an accelerator pedal is not stamped, and a certain transmission gear is selected, as a start gear, and for selecting the memorized start gear for subsequent starting of the vehicle.

20. The apparatus according to claim 19, wherein the memorizing means separately memorizes the gear position of when the vehicle tows another vehicle and the gear position of when the vehicle does not tow the another vehicle.

21. The apparatus according to claim 20, wherein the causing means does not cause the actuator to shift the transmission if the gear position instructed by the shift lever movement for starting is higher than a predetermined gear position.

22. The apparatus according to claim 21, wherein the predetermined gear position is a gear position that allows the vehicle to start with no excessive load being imposed on transmission and clutch parts.

23. The apparatus according to claim 20, wherein the causing means causes the actuator to shift the transmission to a predetermined gear or a gear lower than the predetermined gear if the gear position instructed by the shift lever movement for starting is higher than the predetermined gear position.

24. The apparatus according to claim 23, wherein the predetermined gear position is a gear position that allows the vehicle to start with no excessive load being imposed on transmission and clutch parts.

25. An apparatus comprising:
   means for shifting a transmission;
   means for causing the shifting means to shift the transmission based on movement of a shift lever; and
   means for memorizing a gear position of when a vehicle is stopped over a predetermined period and a certain transmission gear is selected, as a start gear, and for selecting the memorized start gear for subsequent starting of the vehicle.

26. The apparatus according to claim 25, wherein the memorizing means separately memorizes the gear position of when the vehicle tows another vehicle and the gear position of when the vehicle does not tow the another vehicle.

27. The apparatus according to claim 26, wherein the causing means does not cause the actuator to shift the transmission if the gear position instructed by the shift lever movement for starting is higher than a predetermined gear position.

28. The apparatus according to claim 27, wherein the predetermined gear position is a gear position that allows the vehicle to start with no excessive load being imposed on transmission and clutch parts.

29. The apparatus according to claim 26, wherein the causing means causes the actuator to shift the transmission to a predetermined gear or a gear lower than the predetermined gear if the gear position instructed by the shift lever movement for starting is higher than the predetermined gear position.

30. The apparatus according to claim 29, wherein the predetermined gear position is a gear position that allows the vehicle to start with no excessive load being imposed on transmission and clutch parts.

* * * * *